June 11, 1968  K. R. ERIKSON  3,387,604

FOCUSED CONTACT TRANSDUCER

Filed Feb. 23, 1965

INVENTOR.
KENNETH R. ERIKSON

BY
ATTORNEYS

United States Patent Office 3,387,604
Patented June 11, 1968

3,387,604
FOCUSED CONTACT TRANSDUCER
Kenneth R. Erikson, Chicago, Ill., assignor to Magnaflux Corporation, Chicago, Ill., a corporation of Delaware
Filed Feb. 23, 1965, Ser. No. 434,313
8 Claims. (Cl. 128—24)

ABSTRACT OF THE DISCLOSURE

Apparatus for transmission of ultrasonic waves into the interior of a body in which a lens member has one face acoustically coupled to a transducer and an opposite convex face acoustically coupled to the body, the material of the lens member being such that the velocity of transmission is less than the velocity of transmission in the body, a silastic resin material being preferably used. Preferably, the convex face may be in rolling contact with a body for scanning. A second lens member may be provided having a higher velocity of transmission, having a planar face in contact with a planar face of the transducer, and having an opposite concave face in contact with a convex face of the focusing lens member.

---

Figure 1:
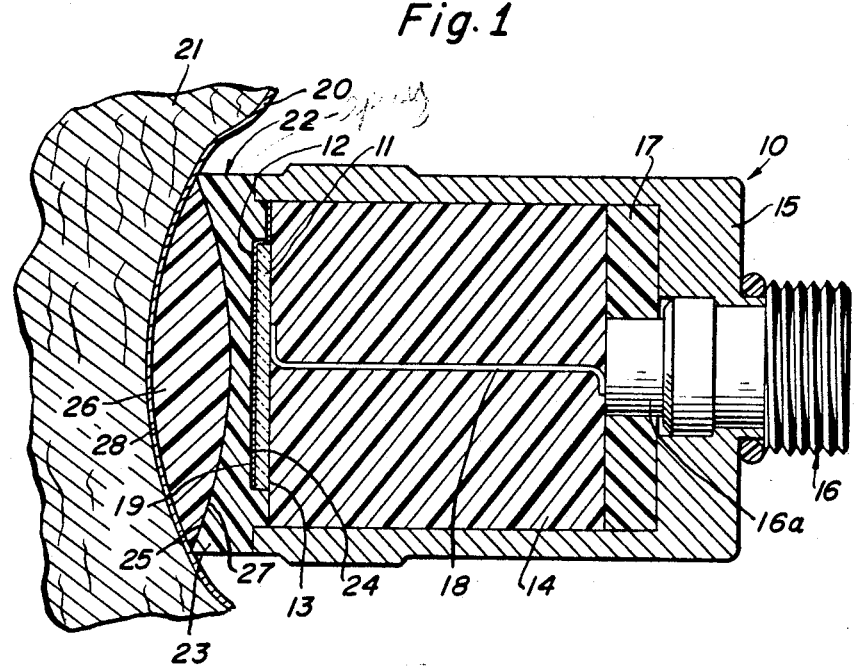

This invention relates to an ultrasonic transducer and more particularly to an ultrasonic transducer for transmitting a beam of ultrasonic waves into a body at a variable angle. The transducer of this invention is comparatively simple and inexpensive in construction while being rugged, durable and efficient. Although having other applications, it is particularly advantageous in medical applications, wherein it may be used for transmitting a concentrated beam of ultrasonic waves through the skin into bodily tissues, either for investigation of the interior bodily structure, or for treatment.

According to this invention, lens means are provided having one face acoustically coupled to an ultrasonic wave-emanating face of a transducer and having an opposite convex face acoustically coupled to a body for transmission of a beam of ultrasonic waves into the body. The prior art has suggested lens means having a concave face, but it is found that with the convex face of the lens means of this invention, it is possible to obtain a concentration or focusing action which is comparable to or superior to that obtained with the concave face, and it is found that other important advantages are obtained.

According to a specific feature, the convex face of the lens means is placed in effective contact with a resiliently deformable surface of a body to be tested, as by placing it in direct contact with skin to transmit ultrasonic waves into bodily tissues. Usually it is desirable to wet the convex surface of the lens means, in order to insure good acoustic contact. With the convex face engaged with the skin, or other resiliently deformable surface, the transducer and lens means may be tilted about an axis close to the convex face, preferably about an axis intersecting the transducer for causing the convex face to roll on the skin or surface, and to thereby vary the angle of the beam. With the rolling action, uniform transmission is obtained through a wide range of angulation of the transducer.

According to a specific feature of the invention, the lens means includes a material in which the velocity of transmission of sound is relatively low, such as to insure focusing toward a point within the interior of the body. In the case of transmission of the waves into water or into bodily tissues, in which the velocity of transmission of sound is substantially the same as in water, the lens means includes a material in which the velocity of transmission of sound is substantially lower than the velocity of transmission in water.

According to a further specific feature of the invention, the lens means includes a silastic resin material in which the velocity of transmission of sound is substantially less than the velocity of transmission in water, but which has a relatively high efficiency, and which is rigid, rugged and durable.

In one preferred embodiment of the invention, the lens means includes a single lens member having a planar face in effective contact with the planar face of a transducer and having an opposite convex face acoustically coupled to the body to be tested or treated. In another preferred embodiment, a first lens member is provided having a planar face in effective contact with the planar face of a transducer and having an opposite face engaged with one face of a second lens member, the other face of the second lens member being convex and being acoustically coupled to the body to be tested or treated. In this embodiment the first lens member is of a material in which the velocity of transmission of sound is low. With the arrangement, the second lens member can be relatively thin which is desirable in that materials having a low velocity of transmission of sound generally have high attenuation characteristics. Preferably, the engaging faces of the first and second lens members are respectively concave and convex.

It is therefore an object of this invention to provide an improved ultrasonic wave transducer which is simple and inexpensive in construction while being durable and rugged, and being useable to transmit a beam of ultrasonic waves at a variable angle.

Another object of the invention is to provide an improved method for transmitting a beam of ultrasonic waves at a variable angle into a body, and particularly into a body having a resiliently deformable surface.

Figure 2:
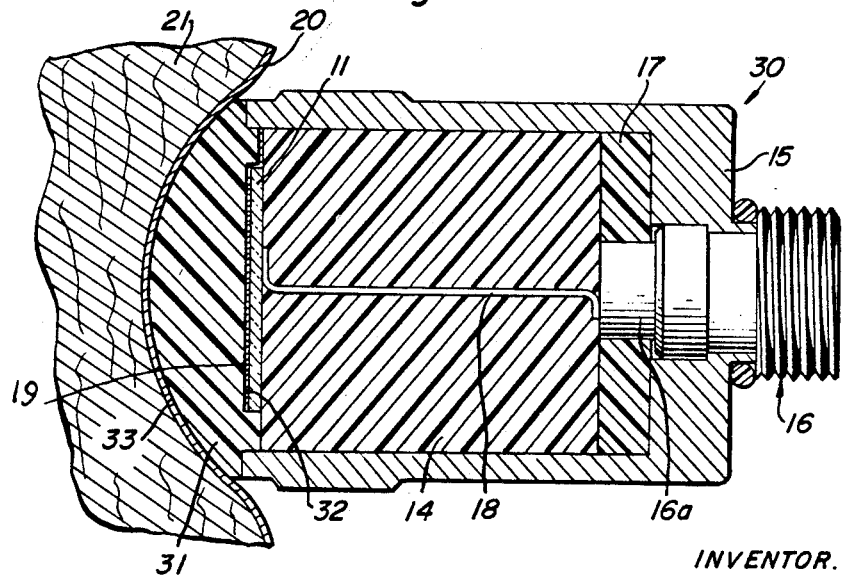

This invention contemplates other objects, features and advantages which will become more fully apparent from the following detailed description taken in conjunction with the accompanying drawings which illustrate preferred embodiments and in which:

FIGURE 1 is a cross-sectional view illustrating a transducer constructed according to the principles of this invention, and used in transmitting ultrasonic waves through skin into bodily tissues; and FIGURE 2 is a cross-sectional view similar to FIGURE 1, but illustrating a modified construction.

Referring to FIGURE 1, reference numeral 10 generally designates a transducer constructed according to the invention and comprising a piezoelectric crystal 11, which has a front face 12 for emanating ultrasonic waves and which has a back face 13, preferably cemented to a backing member 14 of acoustically absorbent material.

As illustrated, the backing member 14 is disposed within a cylindrical metallic housing 15, which carries a coaxial connector 16, for connection to suitable energizing apparatus. A cylindrical conductor of the coaxial connector 16 is connected to a cylindrical conductor 16a which is disposed within an insulating disk 17 in the housing 15. The conductor 16a is connected to one end of a lead 18, disposed within the backing member 14, the other end of the lead 18 being soldered or otherwise connected to a conductive coating forming an electrode on the back face 13 of the crystal 11. A conductive paint 19, such as a silver paint is applied to form an electrode on the front face 12 of the crystal 11 and is extended over to the inner surface of the cylindrical housing 15, to provide an electrical connection through the housing to the outer conductor of the coaxial connector 16.

By way of example the transducer 10 may be connected to pulse-echo apparatus, operative to periodically apply an electrical impulse to the electrodes on the opposite faces of the crystal 11, to develop a burst of ultrasonic waves, which are emanated from the front fact 12 of the crystal 11. Between application of such periodic impulses to the crystal 11, the pulse-echo apparatus may "listen" for returning echos. In the alternative, the transducer may be continuously energized and the ultrasonic waves may be used for through-transmission testing or for treatment or similar purposes.

As illustrated in FIGURE 1, the transducer 10 is engaged with skin 20 for transmission of ultrasonic waves into bodily tissues 21, either for investigation of the interior bodily structure, or for treatment. In both of such applications, it is desirable to be able to angulate the ultrasonic beam and it is also desirable to concentrate or focus the ultrasonic waves at a point within the bodily tissues. According to this invention, the transducer 10 comprises lens means generally designated by reference numeral 22 between the wave-emanating face 12 of the crystal 11 and the skin 20. The lens means 22, illustrated in FIGURE 1, comprises a first lens member 23 having a planar face 24 engaged with the paint or electrode 19 on the face 12 of the crystal 11, and having an opposite face 25 which is preferably concave. The lens means 22 also comprises a second lens member 26 having a convex face 27 engaged with the concave face 25 of the first lens member 23 and having an opposite convex face 28 engaged with the skin 20. Preferably, water or another liquid may be applied to the skin 20, or to the convex face 28, before engagement, to insure good acoustical contact between the interengaged surfaces.

In accordance with this invention, the first lens member 23 is of a material in which the velocity of transmission of sound is substantially higher than the velocity of transmission of sound in the body into which the waves are transmitted, and the second lens member 26 is of a material in which the velocity of transmission of sound is substantially lower than the velocity of transmission in the body into which the waves are transmitted. With this relationship, the waves are focused within a point at the body.

By way of example, the first lens member 23 may be formed of an epoxy resin which may be applied to the face of the transducer assembly, using a suitable mold, and then cured in place. After curing, the resin may be machined to provide the concave face 25. The second lens member 26 may then be cast on the first member 23 using a suitable mold to provide the convex face 28, or it may be separately formed and secured in place by the use of a suitable cement between the interengaged surfaces 25 and 27. The second lens member 26 is preferably of a silastic resin which is relatively rigid, tough and durable, has comparatively low attenuation characteristics and which also has the very desirable property of a low velocity of transmission of sound waves. The velocity of transmission of sound in a silastic resin can be substantially less than the velocity of transmission in water, and in the case of transmission into bodily tissues, this feature is important because the velocity of transmission of sound in bodily tissues is substantially the same as in water. A silastic resin manufactured by Dow Corning Corporation under the trade name "Sylgard" 184 has been found to be suitable.

It should be apparent from FIGURE 1 that the transducer can be angulated while causing the convex face 28 to roll on the skin 20, and while maintaining uniform transmission of the waves into the bodily tissues 21. This advantage can, of course, be obtained in any application wherein waves are to be transmitted into a body having a resiliently deformable surface.

Referring to FIGURE 2, reference numeral 30 illustrates a modified arrangement which is exactly the same as in FIGURE 1, except that the first and second lens members 23 and 26 of FIGURE 1 are replaced by a single lens member 31 having a planar face engaged with the paint or electrode 19 on the wave-emanating face 12 of the crystal 11, and having an opposite convex face 33 engaged with the skin 20. In this arrangement, the single lens member 31 should be of a material in which the velocity of transmission of sound is less than the velocity in the body into which the waves are transmitted. The lens member 31 is preferably of a silastic resin material such as discussed above.

The modified arrangement of FIGURE 2 has the advantage of simplicity, but has the disadvantage that the lens member 31 must be somewhat thicker than the lens member 26 of FIGURE 1, to obtain a comparable focusing action. This is a disadvantage because materials having a low velocity of transmission of sound generally having high attenuation characteristics, and thus it is possible to obtain somewhat higher efficiency with the arrangement of FIGURE 1.

It will be understood that modifications and variations may be effected without departing from the spirit and scope of the novel concepts of this invention.

I claim as my invention:

1. In ultrasonic apparatus for transmission of ultrasonic waves into the interior of a body, transducer means having a face for emanating ultrasonic waves, and lens means having one face acoustically coupled to said face of said transducer and having an opposite convex face adapted to be acoustically coupled to said body for transmission of a beam of ultrasonic waves into said body, said lens means including a material in which the velocity of transmission of sound is low enough to cause waves transmitted from said face to be focused toward a point within the interior of said body.

2. In ultrasonic apparatus for transmission of ultrasonic waves into the interior of a body having a resiliently deformable surface, transducer means having a face for emanating ultrasonic waves, lens means having one face acoustically coupled to said face of said transducer and having an opposite convex face for effective contact with said resiliently deformable surface for transmission of a beam of ultrasonic waves into said body, said transducer and lens means being tiltable about an axis close to said convex face for causing said convex face to roll on said resiliently deformable surface and to vary the angle of said beam while maintaining uniform transmission of said waves into said body, said lens means including a material in which the velocity of transmission of sound is substantially lower than the velocity of transmission in said body.

3. In ultrasonic apparatus for transmission of ultrasonic waves into the interior of a body having a resiliently deformable surface and the body is formed of tissues in which the velocity of transmission of sound is approximately the same as in water, transducer means having a face for emanating ultrasonic waves, lens means having one face acoustically coupled to said face of said transducer and having an opposite convex face for effective contact with said resiliently deformable surface for transmission of a beam of ultrasonic waves into said body and said lens includes a material in which the velocity of transmission of sound is substantially less than the velocity of transmission of sound in water, said transducer and lens means being tiltable about an axis close to said convex face for causing said convex face to roll on said resiliently deformable surface and to vary the angle of said beam while maintaining uniform transmission of said waves into said body.

4. In ultrasonic apparatus for transmission of ultrasonic waves into the interior of a body, transducer means having a generally planar face for emanating ultrasonic waves, a lens member having a planar face in effective contact with said planar face of said transducer and having an opposite convex face adapted to be acoustically coupled to said body, said lens member being of a material in which the velocity of transmission is low enough to cause waves to be transmitted from said convex face to be focused toward a point within said body.

5. In ultrasonic apparatus for transmission of ultrasonic waves into the interior of a body, transducer means having a generally planar face for emanating ultrasonic waves, a first lens member having a planar face in effective contact with said planar face of said transducer means and having an opposite face, and a second lens member having one face in effective contact with said opposite face of said first lens member and having an opposite convex face adapted to be acoustically coupled to said body, said second lens member being of a material in which the velocity of transmission is low enough to cause waves to be converged from said convex face to be focused toward a point within said body.

6. In ultrasonic apparatus that is defined in claim 5, said opposite face of said first lens member being concave and said one face of said second lens member being convex, and said first lens member being of a material in which the velocity of transmission of sound is substantially higher than in said second lens member.

7. In ultrasonic apparatus for transmission of ultrasonic waves through skin into bodily tissues, transducer means having a generally planar face for emanating ultrasonic waves, a first lens member having a planar face in effective contact with said planar face of said transducer means and having an opposite concave face, and a second lens member having a convex face in effective contact with said concave face of said first lens member and having an opposite convex face for effective contact with the skin to transmit sound waves into the bodily tissues, the velocity of transmission of sound and said first lens member being substantially higher than the velocity of transmission of sound in water and the velocity of transmission of sound in said second lens member being less than the velocity of transmission of sound in water.

8. An ultrasonic apparatus for transmission of ultrasonic waves into the interior of a body, transducer means having a face for emanating ultrasonic waves, and lens means having one face acoustically coupled to said face of said transducer and having an opposite convex face adapted to be acoustically coupled to said body for transmission of a beam of ultrasonic waves into said body, said lens means including a silastic resin material in which the velocity of transmission of sound is substantially less than the velocity of transmission of sound in water.

References Cited
FOREIGN PATENTS

| | | |
|---|---|---|
| 174,445 | 3/1953 | Austria. |
| 1,291,311 | 3/1962 | France. |
| 894,421 | 10/1953 | Germany. |

L. W. TRAPP, *Primary Examiner.*